(12) United States Patent
Prasad et al.

(10) Patent No.: US 8,997,064 B2
(45) Date of Patent: Mar. 31, 2015

(54) SYMBOLIC TESTING OF SOFTWARE USING CONCRETE SOFTWARE EXECUTION

(75) Inventors: Mukul R. Prasad, San Jose, CA (US); Maarten H. Wiggers, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 36 days.

(21) Appl. No.: 13/587,423

(22) Filed: Aug. 16, 2012

(65) Prior Publication Data

US 2014/0053139 A1 Feb. 20, 2014

(51) Int. Cl.
*G06F 9/44* (2006.01)
*G06F 11/36* (2006.01)

(52) U.S. Cl.
CPC ..................... *G06F 11/36* (2013.01)
USPC ........................................ 717/131

(58) Field of Classification Search
CPC ............... G06F 7/78; G06F 8/00–8/78; G06F 9/44–9/455; G06F 11/36
USPC .................................. 717/100–178
See application file for complete search history.

(56) References Cited

U.S. PATENT DOCUMENTS

| | | | |
|---|---|---|---|
| 2009/0089759 A1 | 4/2009 | Rajan et al. | |
| 2009/0125976 A1* | 5/2009 | Wassermann et al. | 726/1 |
| 2010/0125832 A1 | 5/2010 | Prasad et al. | |
| 2010/0223599 A1 | 9/2010 | Ghosh et al. | |
| 2010/0242029 A1 | 9/2010 | Tkachuk et al. | |
| 2011/0016456 A1* | 1/2011 | Artzi et al. | 717/131 |
| 2011/0072417 A1* | 3/2011 | Dhurjati et al. | 717/124 |
| 2012/0192150 A1 | 7/2012 | Li et al. | |
| 2012/0192162 A1 | 7/2012 | Li et al. | |
| 2012/0192169 A1 | 7/2012 | Li et al. | |
| 2012/0204154 A1 | 8/2012 | Li et al. | |

OTHER PUBLICATIONS

Pasareanu et al., Combining Unit-level Symbolic Execution and System-level Concrete Execution for Testing NASA Software, 2008.*
Sen, Concolic Testing, 2007.*
Kim et al., SCORE: A Scalable Concolic Testing Tool for Reliable Embedded Software, 2011.*
Yang et al., "Memoized Symbolic Execution", ISSTA 2012, Proceedings of the 2012 International Symposium on Software Testing and Analysis, pp. 144-154.
Godefroid et al., "DART: Directed Automated Random Testing", Proceedings of the 2005 ACM SIGPLAN conference on Programming language design and implementation, pp. 213-223.
Cadar et al., "KLEE: Unassisted and Automatic Generation of High-Coverage Tests for Complex Systems Programs", OSDI 2008, Proceedings of the 8th USENIX conference on Operating systems design and implementation pp. 209-224.

(Continued)

*Primary Examiner* — Wei Zhen
*Assistant Examiner* — Zhan Chen
(74) *Attorney, Agent, or Firm* — Maschoff Brennan

(57) ABSTRACT

A method of testing software may include accessing software that includes multiple execution paths that each include one or more branching points. The method may also include concretely executing the software using multiple concrete inputs to traverse at least two of the execution paths of the software. The method may also include capturing concrete execution results produced from executing the software using the concrete inputs. The method may also include symbolically executing the software using one or more symbolic inputs based on the concrete execution results.

13 Claims, 6 Drawing Sheets

(56) References Cited

OTHER PUBLICATIONS

Godefroid, "Automated Whitebox Fuzz Testing", Proceedings of NDSS, 2008, pp. 1-16.
Sen et al. "CUTE: A Concolic Unit Testing Engine for C", ESEC/FSE-13 2005, Proceedings of the 10th European software engineering conference held jointly with 13th ACM SIGSOFT international symposium on Foundations of software engineering, pp. 263-272.
Majumdar et al., "Hybrid Concolic Testing", ICSE 2007 Proceedings of the 29th international conference on Software Engineering, pp. 416-426.
Pasareanu et al., "Symbolic Execution with Mixed Concrete-Symbolic Solving", ISSTA 2011, pp. 34-44.

* cited by examiner

SYMBOLIC TESTING OF SOFTWARE USING CONCRETE SOFTWARE EXECUTION

FIELD

The embodiments discussed herein are related to testing software.

BACKGROUND

Testing software, such as validating or verifying software, is a common activity among information technology (IT) organizations. For example, whether the software is a desktop application for execution at one or more client computer systems or a web application for execution at one or more server computer systems, it is often important to verify the quality of the software. While some types of errors in software, cause only annoyance or inconvenience to users, other types of errors have the potential to cause other problems, such as data and financial loss.

Software testing is a common method of verifying software quality. With software testing, the software (or one or more portions of software) under analysis is put through a suite of tests and the outputs are evaluated for correctness. However, software testing often provides only limited coverage and has a tendency to miss corner-case bugs. Another common method of software testing is performed by formal verification. Formal verification mathematically proves the satisfiability of a specific requirement on software under analysis or obtains a counterexample in the form of a test case that breaks the requirement and indicates a bug. Formal verification typically uses explicit state-based or symbolic model checkers as internal proof engines.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method for testing software may include accessing software that includes multiple execution paths that each include one or more branching points. The method may also include concretely executing the software using multiple concrete inputs to traverse at least two of the execution paths of the software. The method may also include capturing concrete execution results produced from executing the software using the concrete inputs. The method may also include symbolically executing the software using one or more symbolic inputs based on the concrete execution results.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
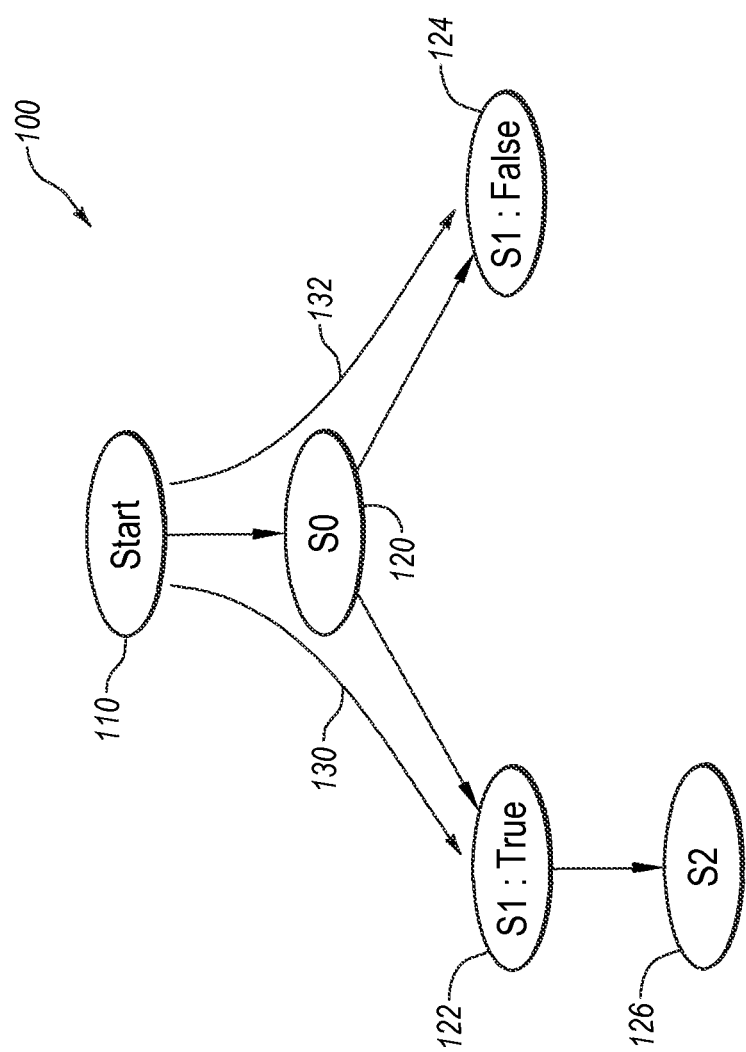
FIG. 1A is a diagram representing an example execution of example software.

Some embodiments described herein relate to methods and systems of testing software. The software to be tested may include multiple execution paths. The execution paths may include one or more branching points, such as conditional software statements, and other software statements, such as assignments, function calls, and other software statements.

In some embodiments, to test the software, the software may be concretely executed using multiple concrete inputs to traverse multiple execution paths of the software. Concrete execution results may be captured from the concrete execution of the software. For example, in some embodiments, the execution paths traversed during the concrete execution may be recorded to form a partial symbolic execution tree. Alternately or additionally, during concrete execution of the software, symbolic constraints may be extracted from the traversed execution paths. The symbolic constraints may be normalized (canonicalized) to generate path condition formulas for which solutions exist.

After concretely executing the software, the software may be symbolically executed using one or more symbolic inputs based on the concrete execution results. During the symbolic execution, the concrete execution results may be used where appropriate to reduce the amount of computations executed during the symbolic execution of the software. For example, in some embodiments, for a portion of an execution path encountered during symbolic execution of the software, a path condition formula for the particular portion of the execution path is generated and solved when the particular portion is not defined within the previously generated partial symbolic execution tree and a formula equivalent to the path condition formula is not previously generated. By using the generated partial symbolic execution tree and generated path condition formulas, a number of path condition formulas generated and/or solved during symbolic execution of the software is reduced. By reducing the number of path condition formulas generated and/or solved during symbolic execution of the software, the computation time and/or complexity and/or the resources for symbolically executing the software may be reduced.

Concrete execution is the execution of a software program using concrete values for various inputs of the software program such as integers, real numbers, strings, characters, true/false, and other arbitrary real values. The concrete execution of software with a single set of concrete inputs may follow a single execution path through the software. The concrete execution and the resulting output, may be examined to determine if and/or when errors may occur within the software or to perform other analyses of the software.

Symbolic execution is a formal software verification technique that is derived from symbolic computation, which uses machines, such as computers, to manipulate mathematical equations and expressions in symbolic form. As applied to software testing, symbolic execution may also be used to analyze if and/or when errors in source code of the software may occur, to predict how code statements affect specified inputs and outputs, and to consider path traversal within the software.

To test software using symbolic execution, symbols representing sets of values replace individual concrete input values, such as numbers, strings, true/false, etc., for the software. The operations used to manipulate such variables are replaced with symbolic versions of the operations so that they may manipulate symbolic formulas and symbols instead of concrete values. The software is then executed as in a normal execution. Systematic analysis may then be performed on the generated symbolic formulas to test the software.

Embodiments of the present invention will be explained with reference to the accompanying drawings.

FIG. 1A is a diagram representing an example execution 100 of example software, arranged in accordance with at least some embodiments described herein. Table 1 includes code corresponding to the example software, used in the example execution 100.

TABLE 1

Function Foo

```
int foo (int a, int b) {
S0:    int c = a+b;
S1:    if (c > 0) {
S2:        c=c+1;
       }
       return c;
}
```

In Table 1, the function foo has two input variables, "a" and "b," and one output variable, "c." With concrete execution of the function foo, the variables "a," "b," and "c" may each have any integer value, such as . . . −2, −1, 0, 1, 2 . . . .

FIG. 1A illustrates various nodes 110, 120, 122, 124 of the function foo. The nodes 110, 120, 122, 124 may represent software statements within the function foo. In general, software statements may be branching points, such as conditional statements, or other statements such as, assignments, function calls or some other operation performed by software. The nodes 110, 120, 122, 124 may be coupled by arcs. The arcs may represent the transition between the nodes 110, 120, 122, 124 and thus transitions between the software statements in the function foo. FIG. 1A further illustrates first and second execution paths 130, 132 that may be traversed as the function foo is executed.

Execution of the function foo may begin at node 110. Node 110 may be followed by node 120. At node 120, line S0 of the function foo is evaluated and the variable "c" is given a value based on the values of the variables "a" and "b." Node 120 may be followed by either node 122 or node 124 depending on the value of the variable "c" because the line S1 includes a conditional if statement. When variable "c" is greater than zero, the line S1 evaluates as true; and the function foo follows the first execution path 130 and proceeds to node 122. Node 122 may be followed by node 126. At node 126, the line S2 is evaluated, the variable "c" is increased, and the function foo ends. When variable "c" is less than zero, the line S1 evaluates as false and the function foo follows the second execution path 132, proceeds to node 124, and the function foo ends. Note that the evaluation of the line S1 depends on the previous evaluation of line S0 and the evaluation of line S2 depends on the previous evaluation of lines S0 and S1. In some embodiments, the evaluation of each software statement within software may depend on software statements that have been previously evaluated. The evaluation of a software statement that depends on previously evaluated software statements may be referred to herein as evaluating a portion of an execution path of the software. In other words, to evaluate a portion of an execution path may involve the evaluation of multiple software statements.

Figure 1B:
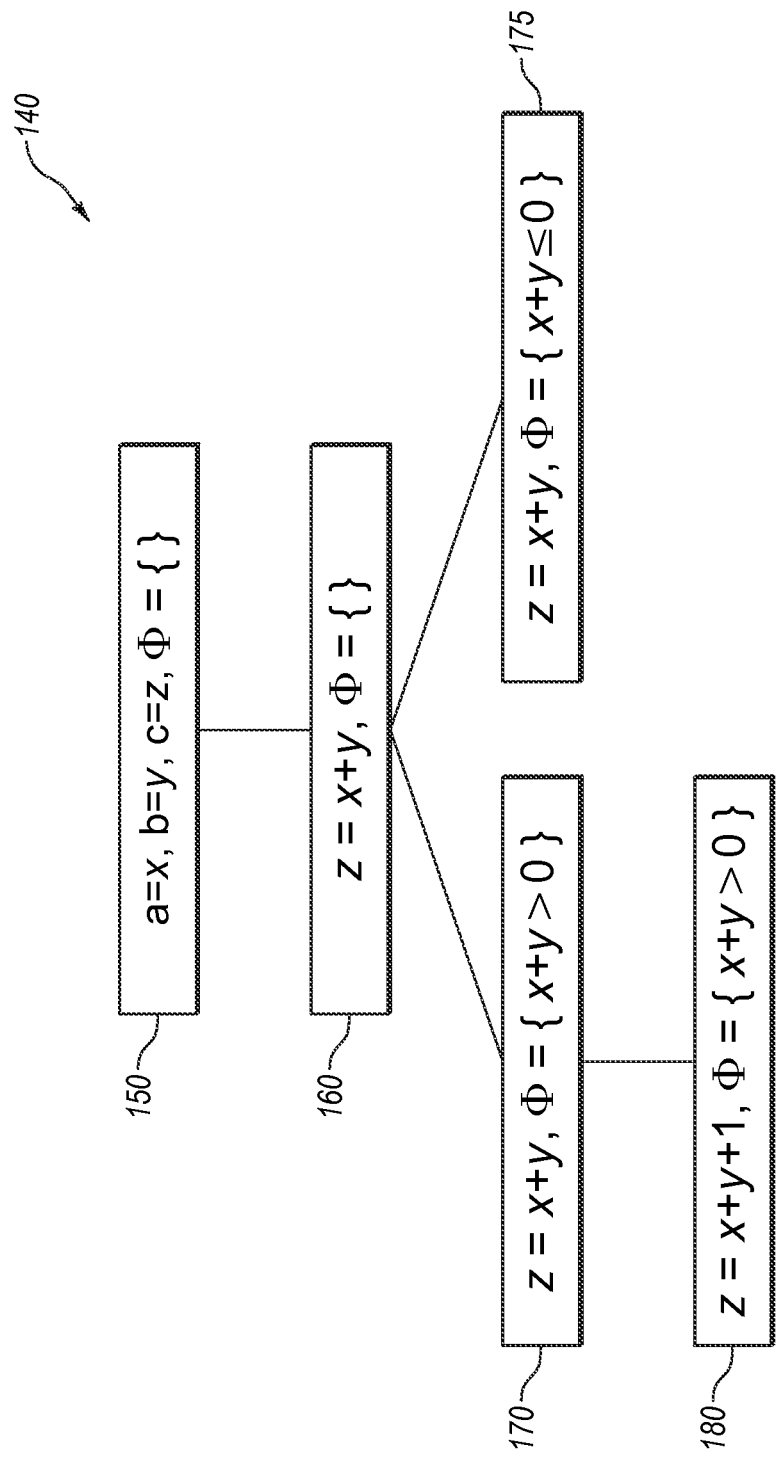
FIG. 1B is a diagram representing an example symbolic execution of the software of FIG. 1A.

FIG. 1B is a diagram representing an example symbolic execution 140 of the example software of FIG. 1A, arranged in accordance with at least some embodiments described herein. The boxes 150, 160, 170, 175, 180 may represent the symbolic execution of a portion of an execution path within the function foo and may generally correspond to nodes 110, 120, 122, 124, and 126 of FIG. 1A respectively. With symbolic execution, the variables "a," "b," and "c" are each assigned a symbolic value that may represent any arbitrary integer value.

FIG. 1B illustrates an example where variable "a" is assigned symbolic value "x," variable "b" is assigned symbolic value "y," and variable "c" is assigned symbolic value "z," where the symbolic values "x, y," and "z" each represents an arbitrary integer value. The code statement "c=a+b" at line S0 symbolically computes as "z=x+y." The code statement "c>0" at line S1 symbolically computes as "z>0," which further evaluates to "x+y>0." The code statement "c=c+1" at line S2 symbolically computes as "z=z+1" or "z=x+y+1."

The symbol "Φ" denotes a path condition formula to be analyzed at each step. A path condition formula may be an expression characterizing an execution path traversed by the execution of a function at any given point during execution of the function. In box 150, the three variables of function foo, "a, b," and "c" are assigned symbolic values "x, y," and "z," respectively. Because this is the beginning of the symbolic execution and no symbolic computation has been performed, the path condition formula "Φ" is empty. Box 150 may be followed by box 160.

At box 160, the symbolic execution of the line S0 of the function foo is represented. The path condition formula "Φ" is still empty, but the symbolic expression of variable "z" may be updated to "z=x+y." The next line, line S1, of the function foo is a conditional "if" statement. Depending on whether the condition, e.g., "c>0" or, in symbolic form, "z>0," is met, box 160 may be followed by box 170 or box 175. When the condition "z>0" is met, at box 170 the path condition formula Φ updates to "Φ={x+y>0}." The symbolic expression for "z" remains unchanged as "z=x+y". Box 170 may be followed by box 180 where line S2 of the function foo is evaluated and the value of "c" is incremented by 1. In symbolic form, the symbolic expression for "z" becomes "z=x+y+1" while the path condition formula remains unchanged from box 170. When the condition "z>0" is not met, at box 175 the path condition formula Φ updates to "Φ={x+y<0}" while the symbolic expression for "z" remains "z=x+y." Note that similar to FIG. 1A where the evaluation of the lines S1 and S2 required the evaluation of previous lines of the function foo, during symbolic execution, the path condition formula for each box changes to represent the software statements that are evaluated to reach the box and thus portions of execution paths of the function foo. In some embodiments, each time there is an update to the path condition formula, the resulting path condition formula may be checked for satisfiability. Such updates may occur at every branch point in software, for example the "if" statement of line S1, or at other points in the software. When the path condition formula is found to be unsatisfiable, symbolic execution is not continued down that portion of the execution path.

One way to test the function foo may be to generate a test case for each execution path covered by the symbolic execution. The symbolic execution of the function foo in FIG. 1B has two execution paths, the first represented by box 180 and the other by box 175. To generate a test-case, the path condition formula at boxes 180 and 175 may be checked for satisfiability to generate concrete values for the symbolic variables x, y, and z corresponding respectively to values for the input variables a, b, and c of the function foo. Each set of concrete input values generated for the variables a, b, and c in this manner may constitute a test case for the function foo. The function foo may be concretely executed with these values and the execution monitored to reveal potential errors in the function foo.

The function foo has only a few lines of code, mainly for illustrative purposes. However, in other situations, the software under analysis may have many variables and many lines of code. It may be appreciated that the complexity of the analysis when solving path condition formulas for portions of execution paths may increase rapidly as the number of variables increases. In some instances, some path condition formulas are not solvable, such as certain types of path condition formulas involving Integer variables with non-convex constraints between them. Furthermore, the demand on resources in terms of processing power, memory, time, etc. may be large for path condition formula solving.

Figure 2:
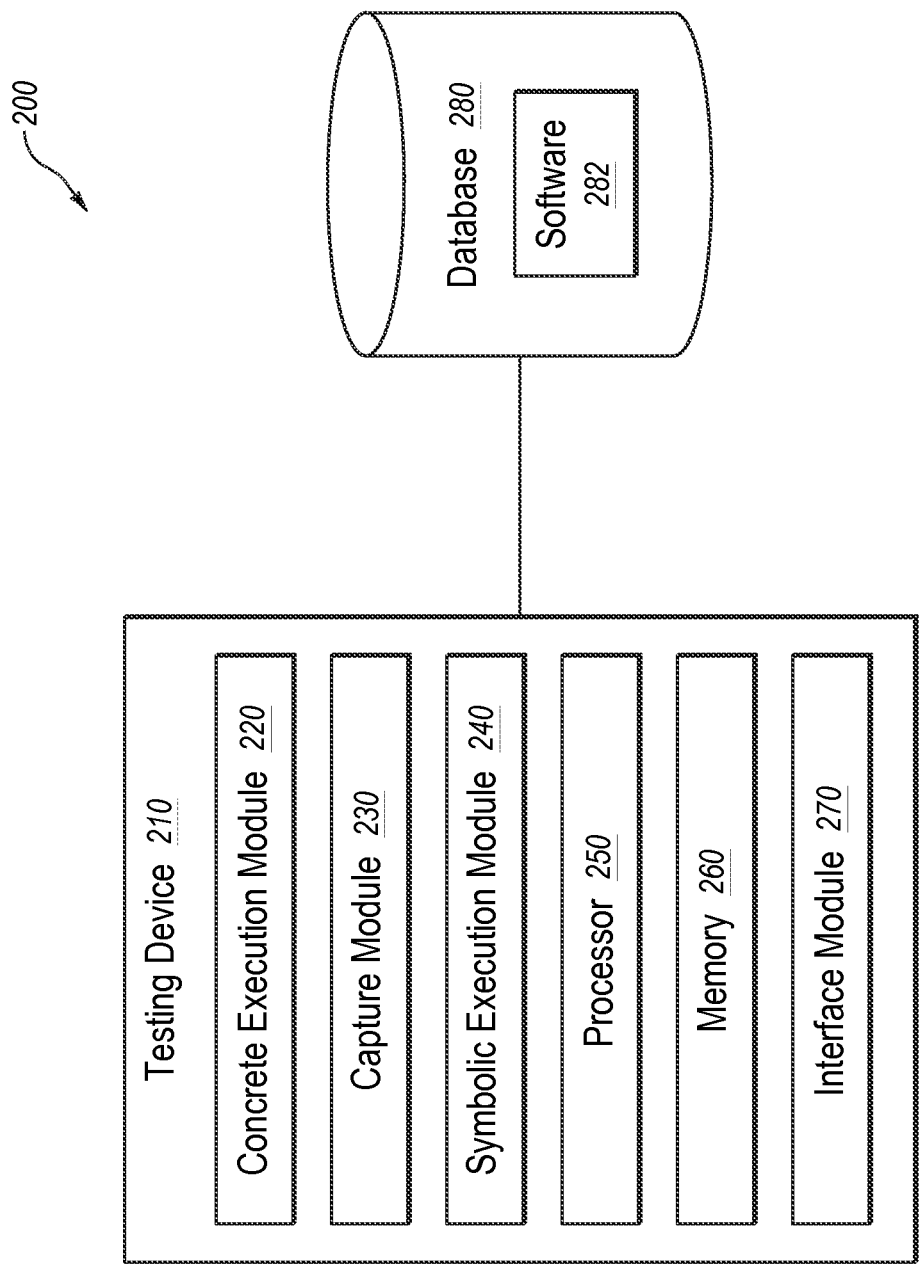
FIG. 2 is a block diagram of an example testing system for testing software.

FIG. 2 is a block diagram of an example testing system 200 for testing software, arranged in accordance with at least some embodiments described herein. The testing system 200 may be used to reduce the number of path condition formulas generated and solved during symbolic execution of the software. In particular, the testing system 200 may use concrete execution results captured from concrete executions of the software to reduce the number of portions of execution paths that involve generating and/or solving path condition formulas.

The testing system 200 may include a testing device 210 that is communicatively coupled to a database 280. The testing device 210 may include, but is not limited to, a concrete execution module 220, a capture module 230, a symbolic execution module 240, a processor 250, a memory 260, and an interface module 270. The testing device 210 may be configured so that each of the concrete execution module 220, the capture module 230, the symbolic execution module 240, the processor 250, the memory 260, and the interface module 270 may communicate with each other and share information. The database 280 may include software 282 that may be tested by the testing device 210.

The software 282 to be tested may include one or more input variables that are associated with multiple execution paths that each include one or more branching points. For example, as illustrated in FIG. 1A, the function foo described above has two execution paths that include the branching point of line S1. The number of execution paths and branching points may vary based on the complexity of the software, the number of input variables, and other aspects of the software 282. The software may be written in any type of computer language, such as Java, C, C++, Pearl, Scheme, Python, among others.

The concrete execution module 220 may be configured to access the software 282 and to execute the software 282 using multiple concrete inputs to traverse at least two of the execution paths of the software 282. Each execution of the software 282 with one set of concrete inputs may traverse a single execution path of the software 282. Thus, to traverse at least two execution paths of the software 282, the concrete execution module 220 is configured to execute the software 282 at least twice with at least one of multiple concrete inputs being different for the different executions. For example, assuming the software 282 has two input variables, during a first execution a first variable input may receive a 2 and a second variable input may receive a 6. During a second execution, the first variable input may continue receiving a 2 and the second variable input may receive an 8. In this context, the concrete inputs are (2, 6), and (2, 8) and the software 282 may traverse two paths when executed with the concrete inputs as defined.

In some embodiments, more than one concrete input may vary between the different executions of the software 282. For example, all of the concrete inputs may vary or some of the concrete inputs may vary between executions of the software.

The concrete execution module 220 may obtain the concrete inputs through a variety of ways. In some embodiments, the concrete execution module 220 may randomly generate the concrete inputs. In some embodiments, the concrete execution module 220 may obtain the concrete inputs from the interface module 270. In these and other embodiments, the interface module 270 may receive manually written test cases that may include the concrete inputs. In some embodiments, the concrete execution module 220 may obtain the concrete inputs from the database 280 and/or the memory 260.

After obtaining the multiple concrete inputs, the concrete execution module 220 may be configured to concretely execute the software 282 using the concrete inputs. In some embodiments, the software 282 may be concretely executed any number of times. In some embodiments, the number of executions of the software 282 by the concrete execution module 220 may depend on a number of different concrete inputs, a number of traversable paths through the software 282, a time allocated for the concrete execution of the software 282, a time allocated for the symbolic execution of the software 282, resource allocation requirements for the number of executions, among others.

The capture module 230 may be configured to capture concrete execution results produced when the concrete execution module 220 concretely executes the software 282 using the multiple concrete inputs. In some embodiments, the capture module 230 may be configured to capture concrete execution results by recording at least one of the traversed execution paths of the software 282 to form a partial symbolic execution tree. For example, in some embodiments, each software statement traversed along an execution path during an execution of the software 282 may be recorded in a string. In some embodiments, each software statement that includes a branching point that allows the execution path to branch along another execution path and the branch taken may be recorded in a data string. The recorded data string for each execution of the software 282 may be stored in a data-structure, such as a trie, hash, or a binary tree, data-structure, among other data-structures. The compilation of one or more recorded execution paths may form the partial symbolic execution tree.

In some embodiments, all of or some of the traversed executions paths may be recorded. In these and other embodiments, an extent of the partial symbolic execution tree may depend on a number of execution paths traversed, a diversity of the execution path as dependent on the overlap of portions of execution paths within each of the execution paths, and/or a number of the execution paths recorded. In some embodiments, each software statement or a subset of the software statements, such as branching points, traversed along an execution path may be recorded using other data structures or organizations other than data strings.

In some embodiments, the capture module 230 may be configured to capture concrete execution results by generating one or more path condition formulas based on at least a portion of one of the traversed execution paths of the software 282. In some embodiments, these formulas may represent path condition formulas that may have been generated by symbolically executing the same execution path taken by the concrete execution.

To generate a path condition formula, the capture module 230 may be configured to extract a symbolic constraint (i.e. a path condition) from a traversed execution path or a portion of a traversed execution path. The symbolic constraint may be a path condition for a single software statement or a path condition for multiple software statement. For example, for the traversed execution path 130 of FIG. 1A, for the node 122, the symbolic constraint may be equal to "x+y>0" as indicated in box 170 of FIG. 1B. In some embodiments, the capture module 230 may extract multiple symbolic constraints from a single traversed execution path.

After extracting the symbolic constraints, the capture module 230 may be configured to normalize (i.e. canonicalize) the extracted symbolic constraints. Normalizing the symbolic constraints may reformat the symbolic constraints into a basic path condition formula. Once in the basic path condition formula, the symbolic constraints may be more easily compared to other path condition formulas.

Note that path condition formulas generated by the capture module 230 have been solved by virtue of the path condition formulas being derived from a concrete execution. A solution to the generated path condition formulas may be the concrete inputs that lead to the traversed execution path of the software 282 used to generate the generated path condition formulas.

In some embodiments, the capture module 230 may be configured to generate path condition formulas and a partial execution tree based on the traversed execution paths of the software 282. In some embodiments, the capture module 230 may be configured to generate the path condition formulas or the partial execution tree but not both.

The capture module 230 may be configured to store the generated path condition formulas and/or the partial execution tree in the database 280 or in the memory 260 as concrete executions results or to send the generated path condition formulas and/or the partial execution tree as concrete execution results to the symbolic execution module 240.

The symbolic execution module 240 may be configured to receive and/or retrieve concrete execution results generated by the capture module 230. The symbolic execution module 240 may also be configured to symbolically execute the software 282 using one or more symbolic inputs based on the concrete execution results. When symbolically executing the software 282, the symbolic execution module 240 may be configured to evaluate portions of execution paths and/or entire execution paths of the software 282. In particular, the symbolic execution module 240 may be configured to determine the satisfiability of a path condition formula for each portion of execution paths of the software 282. When the concrete execution results are associated with a portion of an execution path, the portion of the execution path may be determined to be feasible without having to solve a path condition formula of the portion of the execution path.

In some embodiments, the concrete execution results may be a partial symbolic execution tree. A portion of an execution path may be associated with a partial symbolic execution tree when the portion of the execution path is included in the partial symbolic execution tree. Thus, the portion of the execution path may be deemed as feasible when included in the partial symbolic execution tree. Thus, the symbolic execution module 240 may skip generating and solving the path condition formula for the portion of the execution path.

In some embodiments, the concrete execution results may be one or more generated path condition formulas. A portion of an execution path may be associated with a generated path condition formula when the generated path condition formula is equivalent to a path condition formula of the portion of the execution path. In these and other embodiments, the symbolic execution module 240 may skip solving the path condition formula for the portion of the execution path. When the concrete execution results are not associated with a portion of an execution path, the feasibility of the portion of the execution path may be determined by extracting and/or solving the path condition formula of the portion of the execution path. When the path condition formula is found to be satisfiable, the portion of the execution path may be determined to be feasible.

In some embodiments, the symbolic execution module 240 may receive concrete execution results including a partial symbolic execution tree. In these and other embodiments, the symbolic execution module 240 may symbolically execute the software 282 by evaluating each portion of execution paths of the software 282. For each portion of an execution path, the symbolic execution module 240 may first determine when the partial symbolic execution tree is associated with the portion of the execution path by determining when the portion of the execution path is included in the partial symbolic execution tree. When the portion of the execution path is included in the partial symbolic execution tree (i.e. the partial symbolic execution tree is associated with the portion of the execution path), the symbolic execution module 240 may evaluate a subsequent portion of the execution path and/or portions of other execution paths. When the portion of the execution path is not included in the partial symbolic execution tree (i.e. the partial symbolic execution tree is not associated with the portion of the execution path), the symbolic execution module 240 may solve a path condition formula of the portion of the execution path. When the portion of the execution path is determined to be feasible by solving the path condition formula, the symbolic execution module 240 may evaluate a subsequent portion of the execution path and/or portions of other execution paths.

In some embodiments, the symbolic execution module 240 may receive concrete execution results that may be one or more generated path condition formulas. In these and other embodiments, the symbolic execution module 240 may symbolically execute the software 282 by evaluating each portion of execution paths of the software 282. For each of the portion of an execution path, the symbolic execution module 240 may first determine when the generated path condition formulas are associated with the portion of the execution path by determining when a path condition formula of the portion of the execution path is equivalent to one of the generated path condition formulas. When the path condition formula of the portion of the execution path is equivalent to one of the generated path condition formulas (i.e. one of the generated path condition formulas is associated with the portion of the execution path), the symbolic execution module 240 may evaluate a subsequent portion of the execution path and/or portions of other execution paths. When the path condition formula of the portion of the execution path is not equivalent to one of the generated path condition formulas (i.e. none of the generated path condition formulas are associated with the portion of the execution path), the symbolic execution module 240 may solve a path condition formula of the portion of the execution path. When the portion of the execution path is determined to be feasible by solving the path condition formula, the symbolic execution module 240 may evaluate a subsequent portion of the execution path and/or portions of other execution paths.

In some embodiments, the symbolic execution module 240 may receive concrete execution results including one or more generated path condition formulas and a partial symbolic execution tree. In these and other embodiments, the symbolic execution module 240 may symbolically execute the software 282 by evaluating each portion of execution paths the software 282. The symbolic execution module 240 may solve a path condition formula of the portion of an execution path after having determined that the portion of the execution path is not associated with the received concrete execution results. When the portion of the execution path is associated with the received concrete execution results, the symbolic execution module 240 may not solve the path condition formula of the portion of the execution path. By not solving the path condition formula of the portion of the execution path associated with the received concrete execution results, the symbolic execution module 240 may reduce the number of portion of the execution path for which path condition formulas are solved when symbolically executing the software. By reducing the number of portion of the execution path for which path condition formulas are solved, the demand on resources in terms of processing power, memory, time, etc. may be reduced as compared to solving the path condition formula for each portion of an execution path.

The processor 250 may be configured to execute computer instructions that cause the testing system 200 to perform the functions and operations described herein. The computer instructions may be loaded into the memory 260 for execution by the processor 250 and/or data generated, received, or operated on during performance of the functions and operations described herein may be at least temporarily stored in the memory 260.

The interface module 270 may be configured to receive data from and/or to send data to other systems, users, and/or other processes over any type of communications network. In some embodiments, the interface module 270 may be configured to receive concrete inputs used for concretely executing the software 282. In some embodiments, the interface module 270 may be configured to receive the software 282 and to store the software 282 in the database 280 and/or the memory 260.

Modifications, additions, or omissions may be made to the testing system 200 without departing from the scope of the present disclosure. For example, the testing system 200 may not include the database 280. In these and other embodiments, the software 282 may be stored in the memory 260. In some embodiments, the testing system 200 may be implemented using software of one type to test the software 282 of the same or of a different type. For example, the testing system 200 may be implemented using C++ to test the software 282 that may be either C++, C, or some other programming language.

Figure 3:
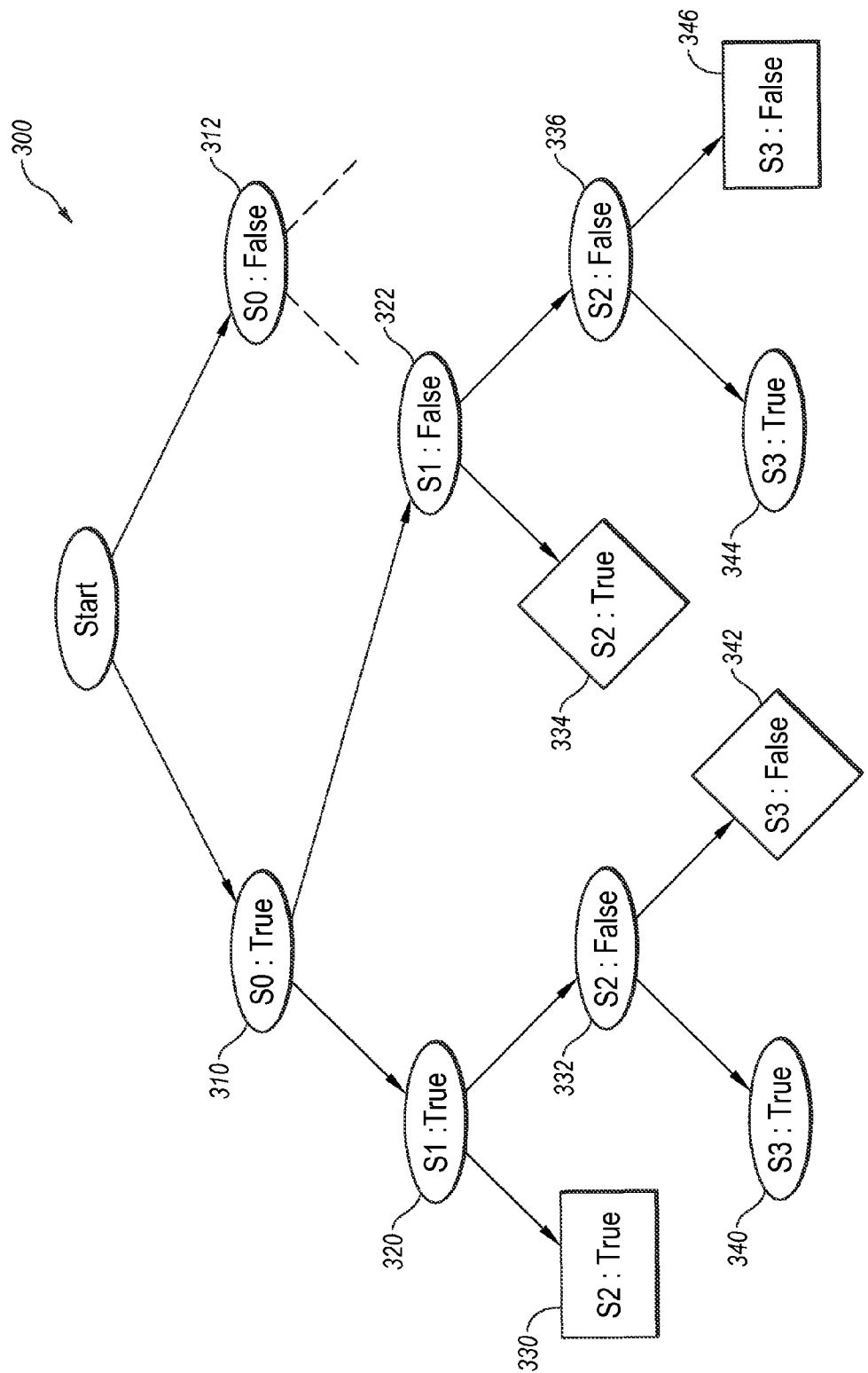
FIG. 3 is a diagram representing an example execution of example software using the testing system of FIG. 2.

FIG. 3 is a diagram representing an example execution 300 of example software using the testing system 200 of FIG. 2, arranged in accordance with at least some embodiments described herein. Table 2 includes code corresponding to the example software used in the example execution 300.

TABLE 2

Function Test

```
int test (int a, int b) {
S0:    if (a < 0) a = -a;
```

TABLE 2-continued

Function Test

```
S1:    if (b < 0) b = -b;
S2:    if (a < 10) {
           return 1;}
S3:    else if (b > 9){
           return -1;}
       else return 0;}
       }
```

The function test of Table 2 has two input variables, "a" and "b." With concrete execution of the function test, the variables "a" and "b" may each have any integer value, such as . . . −2, −1, 0, 1, 2 . . . .

FIG. 3A illustrates various nodes 310, 312, 320, 322, 330, 332, 334, 336, 340, 342, 344, 346 of the function test. The nodes 310, 312, 320, 322, 330, 332, 334, 336, 340, 342, 344, 346 may represent software statements within the function test. In particular, the nodes 310, 312, 320, 322, 330, 332, 334, 336, 340, 342, 344, 346 may represent branching points within the function test. The nodes 310, 312, 320, 322, 330, 332, 334, 336, 340, 342, 344, 346 may be coupled by arcs. The arcs may represent the transition between the nodes 310, 312, 320, 322, 330, 332, 334, 336, 340, 342, 344, 346 and thus transitions between the branching points in the function test through symbolic or concrete execution of intervening software statements in the function test. The software statement of the function test stemming from the node 312 are not illustrated or discussed for ease in explanation, but may exist during testing of the function test.

The execution 300 may indicate how the various nodes 310, 312, 320, 322, 330, 332, 334, 336, 340, 342, 344, 346 are determined to be satisfied using the testing system of FIG. 2. An example operation of the testing system 200 of FIG. 2 using the function test is now explained. First, the concrete execution module 220 may execute the function test using various sets of concrete inputs. Using the concrete inputs, the concrete execution module 220 may traverse execution paths that include the oval nodes 310, 312, 320, 322, 332, 336, 340, 344. The capture module 230 may record the traversed execution paths and form a partial symbolic execution tree that includes the oval nodes 310, 312, 320, 322, 332, 336, 340, 344. The capture module 230 may also generate various path condition formulas based on the traversed execution paths.

The symbolic execution module 240 may then symbolically execute the function test. For each portion of an execution path of the function test that ends at one of the oval nodes 310, 312, 320, 322, 332, 336, 340, 344, (i.e. a branching point) the symbolic execution module 240 may not solve a path condition formula but may determine the portion of the execution path is feasible because the portion of the execution path is included in the partial symbolic tree generated based on the concrete execution of the function test.

For each portion of an execution path that ends at one of the diamond nodes 334, 342, the symbolic execution module 240 may not solve a path condition formula but may determine the portion of the execution path is feasible because a path condition formula of the portion of the execution path is equivalent to one of the generated path condition formulas that is generated based on the concrete execution of the function test or generated earlier during a current symbolic execution of the function test.

For each portion of an execution path that ends at one of the square nodes 330, 346, the symbolic execution module 240 may solve a path condition formula to determine if the portion of the execution path is feasible. Thus, by symbolically executing the function test based on the concrete execution results, path condition formulas of just two portion of execution paths, those portion of execution paths that end at nodes 330, 346, are solved instead of solving path condition formulas for portion of execution paths that end at the nodes 310, 312, 320, 322, 330, 332, 334, 336, 340, 342, 344, 346. By reducing the number of symbolic executions formulas solved during symbolic execution of the function test, the computation time and/or complexity and/or the resources for symbolically executing the function test may be reduced.

Figure 4:
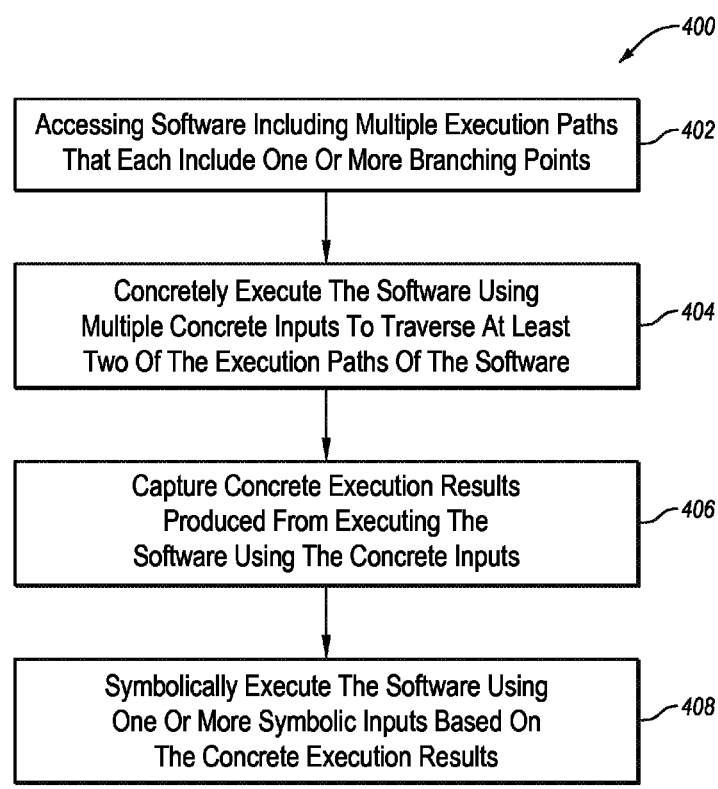
FIG. 4 is a flow chart of an example method of testing software.

FIG. 4 is a flow chart of an example method 400 of testing software, arranged in accordance with at least some embodiments described herein. The method 400 may be implemented, in some embodiments, by a testing system, such as the testing system 200 of FIG. 2. For instance, the processor 250 of the testing system 200 of FIG. 2 may be configured to execute computer instructions to perform operations for testing software as represented by one or more of blocks 402, 404, 406, and/or 408 of the method 400. Although illustrated as discrete blocks, various blocks may be divided into additional blocks, combined into fewer blocks, or eliminated, depending on the desired implementation.

The method 400 may begin at block 402, where software including multiple execution paths that each include one or more branching points may be accessed. The number of branching points and execution paths may vary based on the complexity, the number of input variables, and other aspects of the software.

In block 404, the software may be concretely executed using multiple concrete inputs to traverse at least two of the execution paths of the software. Each execution of the software with one set of concrete inputs may traverse a single execution path of the software. Thus, to traverse at least two execution paths of the software, the software may be executed at least twice with at least one of the concrete inputs being different for the different executions. In some embodiments, the concrete inputs may be randomly selected. Alternately or additionally, the concrete inputs may be user defined.

In block 406, concrete execution results produced from executing the software using the concrete inputs may be captured. In some embodiments, capturing the concrete execution results may include recording at least one portion of the traversed execution paths to form a partial symbolic execution tree. Alternately or additionally, capturing the concrete execution results may include generating a path condition formula for one portion of one of the traversed execution paths of the software. Because the path condition formula is generated from concrete execution results, the path condition formula may be deemed satisfiable. In some embodiments, generating the path condition formula may include various steps. For example, generating the path condition formula may include extracting one or more symbolic constraints from at least one portion of one of the traversed execution paths of the software and normalizing the symbolic constraints to generate the path condition formula.

In block 408, the software may be symbolically executed using one or more symbolic inputs based on the concrete execution results. In some embodiments, symbolically executing the software using one or more symbolic inputs based on the concrete execution results may include solving a path condition formula of a first portion of one of the execution paths of the software when the concrete execution results are not associated with the first portion. In some embodiments, a portion of one of the execution paths may be associated with the concrete execution results, where the concrete execution results include a partial symbolic execution tree, when the portion of the one of the execution paths is included in the partial symbolic execution tree. In some embodiments, a portion of one of the execution paths may be associated with the concrete execution results, where the concrete execution results include one or more generated path condition formulas, when a path condition formula of the portion of the one of the execution paths is equivalent to one of the one or more generated path condition formulas.

In some embodiments, symbolically executing the software using one or more symbolic inputs based on the concrete execution results may include determining whether a first portion encountered during symbolic execution of the software is part of the partial symbolic execution tree. When the first portion is not part of the partial symbolic execution tree, symbolically executing the software may further include determining whether the generated path condition formula is equivalent to a path condition formula of the first portion. When the generated path condition formula is not equivalent to the path condition formula of the first portion, symbolically executing the software may further include solving a path condition formula of the first portion. In some embodiments, the method 400 may be implemented using software of one type to test the software of the same or of a different type. For example, the method 400 may be implemented using C++ to test the software that may be either C++, C, or some other programming language.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
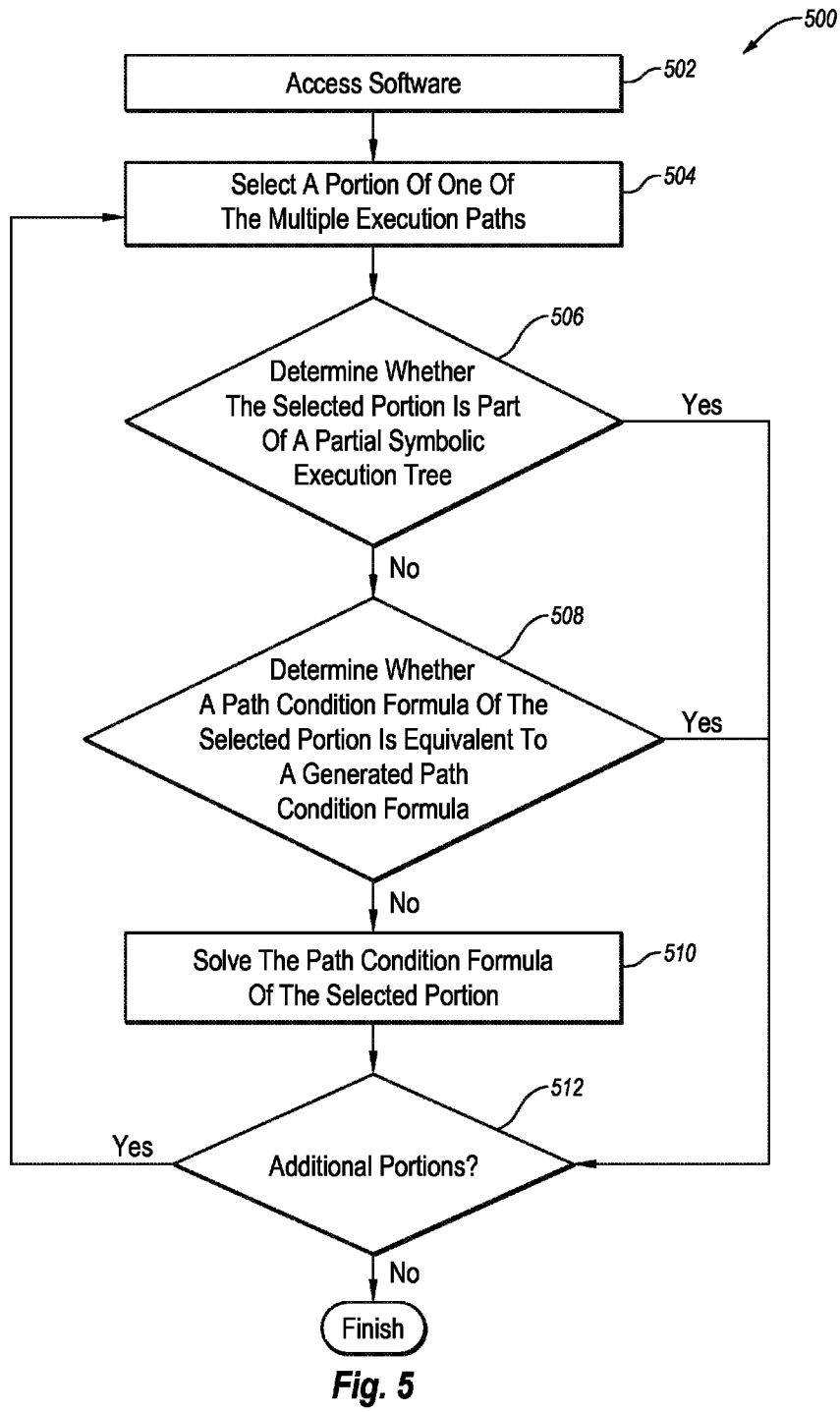
FIG. 5 is a flow chart of another example method of testing software.

FIG. 5 is a flow chart of another example method 500 of testing software, arranged in accordance with at least some embodiments described herein. The method 500 may be implemented, in some embodiments, by a testing system, such as the testing system 200 of FIG. 2. For instance, the processor 250 of the testing system 200 of FIG. 2 may be configured to execute computer instructions to perform operations for testing software as represented by one or more of blocks 502, 504, 506, 508, 510, and/or 512 of the method 500. Although illustrated as discrete blocks, various blocks may be divided into additional blocks, combined into fewer blocks, or eliminated, depending on the desired implementation.

The method 500 may begin at block 502, where software including multiple execution paths that may include one or more branching points may be accessed. The number of execution paths and branching points may vary based on a complexity, a number of input variables, and other aspects of the software.

In block 504, a portion of one of the multiple execution paths of the software may be selected. In block 506, it may be determined whether the selected portion is part of a partial symbolic execution tree. The partial symbolic execution tree may be constructed based on concretely executing the software using multiple concrete inputs to traverse at least two of the execution paths of the software. In some embodiments, the partial symbolic execution tree may be constructed by recording at least one of the traversed execution paths of the software when concretely executed.

When the selected portion is part of the partial symbolic execution tree, the method 500 may proceed to block 512. When the selected portion is not part of the partial symbolic execution tree, the method 500 may proceed to block 508.

In block 508, it may be determined whether a path condition formula of the selected portion is equivalent to a generated path condition formula. The generated path condition formula may be generated based on the concrete execution of the software using the concrete inputs. In some embodiments, the generated path condition formula may be generated by extracting at least one symbolic constraint from at least a portion of one of the traversed execution paths of the software and normalizing the at least one symbolic constraint to generate the generated path condition formula.

When the path condition formula of the selected portion is equivalent to the generated path condition formula, the method 500 may proceed to block 512. When the path condition formula of the selected portion is not equivalent to the generated path condition formula, the method 500 may proceed to block 510.

In block 510, the path condition formula of the selected portion may be solved. In block 512, it may be determined if there are additional portions in the software. When there are additional portions in the software, the method 500 may proceed to block 504. When there are not additional portions in the software the method 500 may finish.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of testing software, the method comprising:
accessing software comprising a plurality of execution paths that each include one or more branching points;
concretely executing the software using a first plurality of concrete inputs to traverse a first execution path of the plurality of execution paths of the software and using a second plurality of concrete inputs to traverse a second execution path of the plurality of execution paths of the software;
capturing concrete execution results produced from concretely executing the software using the first and second pluralities of concrete inputs to generate a first path condition formula based on at least a portion of one of the first and second traversed execution paths of the software, the concrete execution results produced without solving a path condition formula for either of the first and second execution paths and indicating software statements traversed by the first and second execution paths of the software; and
after capturing the concrete execution results using the first and second pluralities of concrete inputs, symbolically executing the software using one or more symbolic inputs based on the concrete execution results such that the concrete execution of the first and second execution paths and the symbolic execution are performed sequentially and not in parallel, wherein the symbolic execution comprises:
for a first portion of one of the plurality of execution paths encountered during symbolic execution of the software:
determining whether the first portion is included in the concrete execution results;
when the first portion is not included in the concrete execution results, determining whether a second path condition formula of the first portion is equivalent to the first path condition formula; and
when the second path condition formula of the first portion is not equivalent to the first path condition formula, solving the path condition formula of the first portion.

2. The method of claim 1, wherein the concrete inputs are randomly selected, obtained from a set of manually written test cases, or both.

3. The method of claim 1, wherein the one or more branching points comprise a conditional statement within the software.

4. The method of claim 1, wherein the first portion of the one of the plurality of execution paths comprises of branching points and non-branching statements.

5. The method of claim 1, wherein the first path condition formula is considered solvable.

6. The method of claim 1, wherein the capturing concrete execution results produced from concretely executing the software using the first and second pluralities of concrete inputs to generate the first path condition formula comprises:
extracting one or more symbolic constraints from at least a portion of one of the first and second traversed execution paths of the software; and normalizing the symbolic constraints to generate the path condition formula.

7. A system for testing software, the system comprising:
memory configured to store one or more computer-readable instructions configured to test software; and
a processor configured to execute the computer-readable instructions to perform operations, the operations comprising:
accessing software comprising a plurality of execution paths that each include one or more branching points;
concretely executing the software using a first plurality of concrete inputs to traverse a first execution path of the plurality of execution paths of the software and using a second plurality of concrete inputs to traverse a second execution path of the plurality of execution paths of the software;
capturing concrete execution results produced from concretely executing the software using the first and second pluralities of concrete inputs to generate a first path condition formula based on at least a portion of one of the first and second traversed execution paths of the software, the concrete execution results produced without solving a path condition formula for either of the first and second execution paths and indicating software statements traversed by the first and second execution paths of the software; and
after capturing the concrete execution results using the first and second pluralities of concrete inputs, symbolically executing the software using one or more symbolic inputs based on the concrete execution results such that the concrete execution of the first and second execution paths and the symbolic execution are performed sequentially and not in parallel, wherein the symbolic execution comprises:
for a first portion of one of the plurality of execution paths encountered during symbolic execution of the software:
determining whether the first portion is included in the concrete execution results;
when the first portion is not included in the concrete execution results, determining whether a second path condition formula of the first portion is equivalent to the first path condition formula; and
when the second path condition formula of the first portion is not equivalent to the first path condition formula, solving the path condition formula of the first portion.

8. The system of claim 7, wherein the concrete inputs are randomly selected, obtained from a set of manually written test cases, or both.

9. The system of claim 7, wherein the second path condition formula includes path conditions for multiple conditional statements in the first portion of the software.

10. A method of testing software, the method comprising:
accessing software comprising a plurality of execution paths that each include one or more branching points;
concretely executing the software using a plurality of concrete input sets to traverse at least two of the execution paths of the software to generate concrete execution results and a first path condition formula, the concrete execution results generated without solving the at least two of the execution paths of the software;
after concretely executing the at least two of the execution paths of the software using the plurality of concrete input sets, symbolically executing the software to perform symbolic testing of the software such that the concrete execution of the at least two of the execution paths of the software and the symbolic execution are performed sequentially and not in parallel, the symbolic execution of a first portion of one of the plurality of execution paths encountered during the symbolic testing of the software including:
determining whether the first portion is part of the concrete execution results;
when the first portion is not part of the concrete execution results, determining whether a second path condition formula that includes symbolic constraints included in one or more conditional statements in the first portion and that is generated during the symbolic execution of the software is equivalent to the first path condition formula; and
when the second path condition formula is not equivalent to the first path condition formula, solving the second path condition formula of the first portion.

11. The method of claim 10, further comprising constructing a partial symbolic execution tree by recording at least a portion of one of the traversed execution paths of the software when concretely executed.

12. The method of claim 10, wherein the first path condition formula is generated by extracting at least one symbolic constraint from at least a portion of one of the traversed execution paths of the software and normalizing the at least one symbolic constraint to generate the first path condition formula.

13. The method of claim 10, wherein the concrete inputs are randomly selected, obtained from a set of manually written test cases, or both.

* * * * *